United States Patent
Yamashita (10) Patent No.: US 8,120,692 B2
(45) Date of Patent: Feb. 21, 2012

(54) IMAGE PICKUP APPARATUS

(75) Inventor: Tomoya Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 12/018,944

(22) Filed: Jan. 24, 2008

(65) Prior Publication Data

US 2008/0186398 A1     Aug. 7, 2008

(30) Foreign Application Priority Data

Feb. 7, 2007   (JP) .................................. 2007-028275

(51) Int. Cl.
    *H04N 5/222*      (2006.01)
(52) U.S. Cl. .................................. 348/333.09
(58) Field of Classification Search .......... None
    See application file for complete search history.

(56) References Cited

U.S. PATENT DOCUMENTS

| 5,392,088 A * | 2/1995 | Abe et al. ................... 396/79 |
| 5,604,562 A * | 2/1997 | Aoyama ..................... 396/79 |
| 2006/0127080 A1 | 6/2006 | Mori |
| 2007/0153113 A1 * | 7/2007 | Ueda et al. ................. 348/335 |

FOREIGN PATENT DOCUMENTS

JP        2006-163094 A       6/2006

* cited by examiner

*Primary Examiner* — Sinh Tran
*Assistant Examiner* — Jason Flohre
(74) *Attorney, Agent, or Firm* — Canon USA Inc IP Division (57) ABSTRACT

An image pickup apparatus includes a first operation unit indicating a state set by the position of a first operation member, such as a dial, and a second operation unit indicating a state that is set so as to be irrelevant to the position of a second operation member, such as a pushbutton switch. If the first operation unit is set so as to inhibit a combination with the electronic viewfinder mode in the optical viewfinder mode, the image pickup apparatus does not perform switching to the electronic viewfinder mode. If the second operation unit is set so as to inhibit a combination with the electronic viewfinder mode in the optical viewfinder mode, the image pickup apparatus switches the above setting to a setting in which the combination with the electronic viewfinder mode is not inhibited to switch to the electronic viewfinder mode.

14 Claims, 6 Drawing Sheets

IMAGE PICKUP APPARATUS

BACKGROUND OF THE INVENTION

1. Field of the Invention

The present invention relates to an image pickup apparatus capable of switching between an electronic viewfinder mode and an optical viewfinder mode.

2. Description of the Related Art

Some digital single lens reflex cameras in recent years have live view functions of displaying images of subjects on the monitors of the cameras (for example, refer to Japanese Patent Laid-Open No. 2006-163094). Such digital cameras can switch the observation mode between an observation mode using an optical viewfinder (optical viewfinder mode) and an observation mode by live view (live view mode).

The digital cameras described above can freely switch the optical viewfinder mode to the live view mode regardless of the operation mode thereof. However, since the optical viewfinder mode adopts an automatic focus (AF) method and a metering method different from those adopted in the live view mode, some operation modes are not appropriate for the live view mode under the current situation.

SUMMARY OF THE INVENTION

According to an embodiment of the present invention, an image pickup apparatus includes an optical viewfinder; an electronic viewfinder; a viewfinder mode switching unit configured to switch between an electronic viewfinder mode in which a subject is observed with the electronic viewfinder and an optical viewfinder mode in which the subject is observed with the optical viewfinder; a first operation unit that can be set so as to inhibit a combination with the electronic viewfinder mode and that can be set so as not to inhibit the combination with the electronic viewfinder mode; a second operation unit that can be set so as to inhibit a combination with the electronic viewfinder mode and that can be set so as not to inhibit the combination with the electronic viewfinder mode; and a control unit configured not to perform switching to the electronic viewfinder mode if the first operation unit is set so as to inhibit the combination with the electronic viewfinder mode in the optical viewfinder mode, and configured to switch the setting which is set by the second operation unit and in which the combination with the electronic viewfinder mode is inhibited to the setting in which the combination with the electronic viewfinder mode is not inhibited to switch to the electronic viewfinder mode if the second operation unit is set so as to inhibit the combination with the electronic viewfinder mode in the optical viewfinder mode.

According to another embodiment of the present invention, an image pickup apparatus includes an optical viewfinder; an electronic viewfinder; a viewfinder mode switching unit configured to switch between an electronic viewfinder mode in which a subject is observed with the electronic viewfinder and an optical viewfinder mode in which the subject is observed with the optical viewfinder; a first operation unit that can be set so as to inhibit a combination with the electronic viewfinder mode and that can be set so as not to inhibit the combination with the electronic viewfinder mode; a second operation unit that can be set so as to inhibit a combination with the electronic viewfinder mode and that can be set so as not to inhibit the combination with the electronic viewfinder mode; and a control unit configured to switch the electronic viewfinder mode to the optical viewfinder mode if the first operation unit is set so as to inhibit the combination with the electronic viewfinder mode in the electronic viewfinder mode, and configured to keep the electronic viewfinder mode and inhibit switching to the setting which is set by the second operation unit and in which the combination with the electronic viewfinder mode is inhibited if the second operation unit is set so as to inhibit the combination with the electronic viewfinder mode in the electronic viewfinder mode.

According to another embodiment of the present invention, an image pickup apparatus includes an optical viewfinder; an electronic viewfinder; a viewfinder mode switching unit configured to switch between an electronic viewfinder mode in which a subject is observed with the electronic viewfinder and an optical viewfinder mode in which the subject is observed with the optical viewfinder; a first operation unit configured to indicate a state set by the position of a member that is operated; a second operation unit configured to indicate a state that is set so as to be irrelevant to the position of a member that is operated; and a control unit configured to determine whether switching to the electronic viewfinder mode is performed on the basis of a state set by the first operation unit if the switching from the optical viewfinder mode to the electronic viewfinder mode is instructed and, if the switching to the electronic viewfinder mode is performed, configured to forcedly change the setting set by the second operation unit to switch to the electronic viewfinder mode.

According to another embodiment of the present invention, an image pickup apparatus includes an optical viewfinder; an electronic viewfinder; a viewfinder mode switching unit configured to switch between an electronic viewfinder mode in which a subject is observed with the electronic viewfinder and an optical viewfinder mode in which the subject is observed with the optical viewfinder; a first operation unit configured to indicate a state set by the position of a first operation member; a second operation unit configured to indicate a state that is set so as to be irrelevant to the position of a second operation member; and a control unit configured not to perform switching to the electronic viewfinder mode if the first operation unit is set so as to be inappropriate for the electronic viewfinder mode in the optical viewfinder mode, and configured to forcedly clear the setting which is set by the second operation unit and which is inappropriate for the electronic viewfinder mode to switch to the electronic viewfinder mode if the second operation unit is set so as to be inappropriate for the electronic viewfinder mode in the optical viewfinder mode.

According to another embodiment of the present invention, an image pickup apparatus includes an optical viewfinder; an electronic viewfinder; a viewfinder mode switching unit configured to switch between an electronic viewfinder mode in which a subject is observed with the electronic viewfinder and an optical viewfinder mode in which the subject is observed with the optical viewfinder; a first operation unit configured to indicate a state set by the position of a first operation member; a second operation unit configured to indicate a state that is set so as to be irrelevant to the position of a second operation member; and a control unit configured to forcedly switch to the optical viewfinder mode if the first operation unit is set so as to be inappropriate for the electronic viewfinder mode in the electronic viewfinder mode, and configured to keep the electronic viewfinder mode and not to perform the setting which is set by the second operation unit and which is inappropriate for the electronic viewfinder mode if the second operation unit is set so as to be inappropriate for the electronic viewfinder mode in the electronic viewfinder mode.

Further features and aspects of the present invention will become apparent from the following description of exemplary embodiments with reference to the attached drawings.

DESCRIPTION OF THE EMBODIMENTS

Embodiments of the present invention will now herein be described with reference to the attached drawings.

Figure 1:
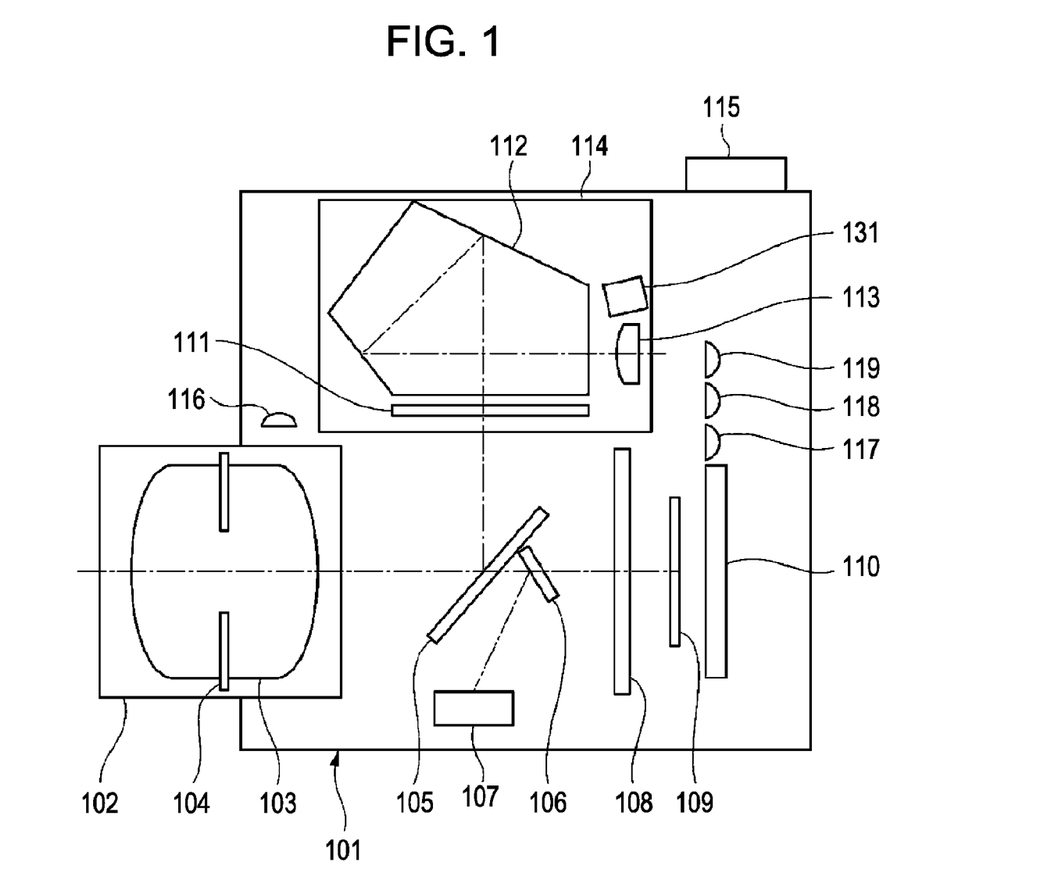
FIG. 1 illustrates an example of the internal mechanical structure of an image pickup apparatus according to an embodiment of the present invention.

FIG. 1 illustrates an example of the internal mechanical structure of an image pickup apparatus according to an embodiment of the present invention. The image pickup apparatus is embodied by a digital single lens reflex (SLR) still camera (digital camera).

Referring to FIG. 1, the image pickup apparatus includes a camera body 101, an interchangeable lens 102 removably mounted to the camera body 101, an imaging optical system 103, an aperture mechanism 104, a main mirror 105, a movable sub-mirror 106, a focus detector 107, a shutter mechanism 108, and an image pickup device 109. The imaging optical system 103 is arranged in the lens 102 and forms an image of an object on the image pickup device 109. The aperture mechanism 104 is arranged in the lens 102 and varies the aperture diameter to adjust the exposure. The main mirror 105 is composed of a movable half mirror and reflects part of light supplied from the imaging optical system 103 to supply the reflected light to a viewfinder optical system 114, described below. The sub-mirror 106 is arranged behind the main mirror 105. The sub-mirror 106 reflects luminous fluxes near the optical axis, among the light transmitted through the main mirror 105, to supply the reflected luminous fluxes to the focus detector 107.

At shooting or when a monitored image is displayed or a moving image is captured, the main mirror 105 and the sub-mirror 106 are retracted from the optical path and the shutter mechanism 108 is opened to directly lead the luminous fluxes from the lens 102 to the image pickup device 109.

The image pickup apparatus also includes a display unit 110, a focusing screen 111, a pentaprism 112, an eyepiece 113, and a metering device 131. The display unit 110 is arranged at the back surface of the camera body 101. A monitored image is displayed in the display unit 110.

The focusing screen 111 is arranged on the image plane on which an image of an object is formed in the viewfinder optical system 114. The eyepiece 113 is used to observe an optical viewfinder image. The focusing screen 111, the pentaprism 112, and the eyepiece 113 forms the viewfinder optical system 114. The metering device 131 is arranged in the viewfinder optical system 114.

The image pickup apparatus further includes a shooting mode dial 115 (a first operation member), a release switch 116, a viewfinder mode selection switch 117, an AF mode selection button 118 (a second operation member), and a metering mode selection button 119 (a second operation member). The viewfinder mode selection switch 117 is used to permit or inhibit capturing of a still image with reference to a live-view image (an electronic viewfinder image). The AF mode selection button 118 is a pushbutton switch used to switch the AF mode. Repeatedly pressing the AF mode selection button 118 can alternately switch the AF mode between "one-shot AF" and "servo AF". The AF mode that is currently set is displayed in the display unit 110. Accordingly, the state of the AF mode selection button 118 is irrelevant to the AF mode that is currently set. Similarly, the metering mode selection button 119 is a pushbutton switch used to switch the metering mode. Repeatedly pressing the metering mode selection button 119 can alternately switch the metering mode between "evaluation metering" and "partial metering". The metering mode that is currently set is displayed in the display unit 110. Accordingly, the state of the metering mode selection button 119 is irrelevant to the metering mode that is currently set.

Figure 2:
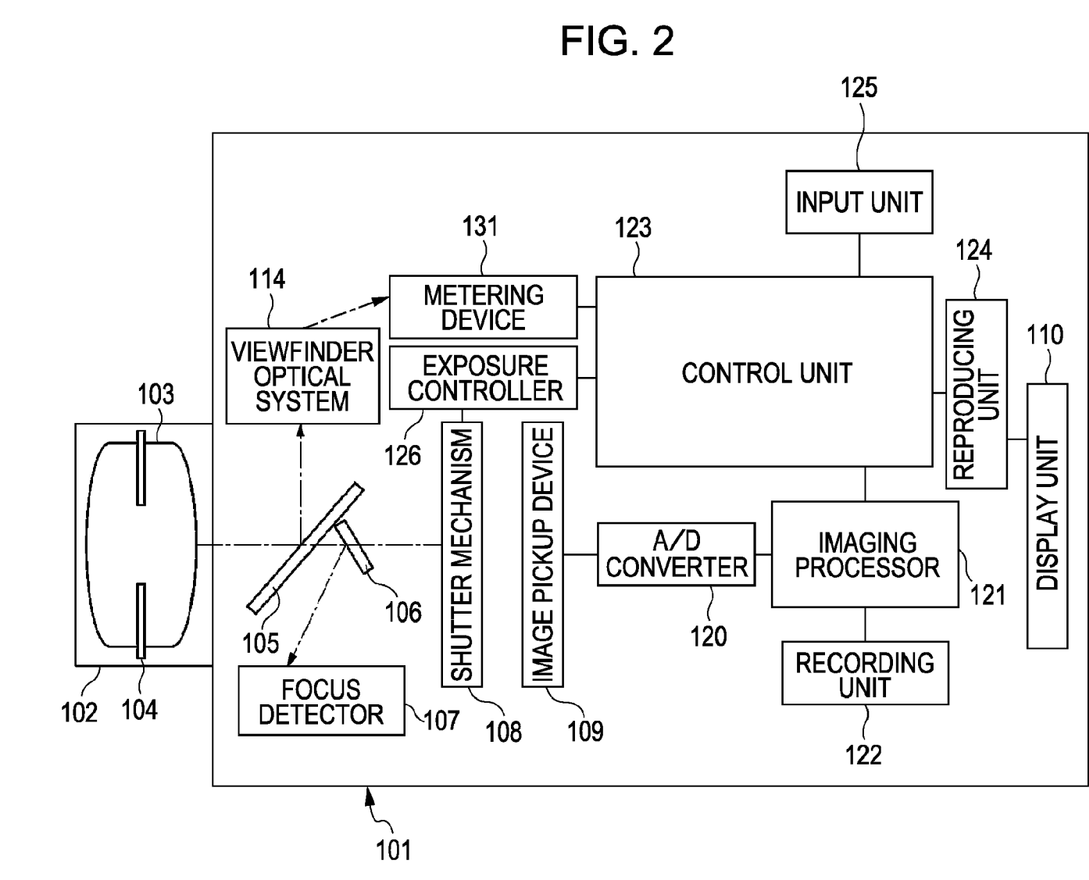
FIG. 2 is a block diagram illustrating an example of the electrical configuration of the image pickup apparatus illustrated in FIG. 1.

FIG. 2 is a block diagram illustrating an example of the electrical configuration of the image pickup apparatus illustrated in FIG. 1.

Referring to FIG. 2, the image pickup apparatus includes an analog-to-digital (A/D) converter 120, an imaging processor 121, a recording unit 122, and a control unit 123. The A/D converter 120 converts an analog image signal supplied from the image pickup device 109 into a digital image signal. The imaging processor 121 performs, for example, white balancing, gamma correction, and signal interpolation to the digital image signal supplied from the A/D converter 120. The imaging processor 121 also performs correction of pixel information included in the digital image signal. The imaging processor 121 further performs conversion of an RGB signal into a YC signal. The recording unit 122 has image information acquired by the imaging processor 121 recorded therein. The control unit 123 controls the components in the camera body 101. Although not illustrated in FIG. 2, the control unit 123 includes, for example, a central processing unit (CPU), a read only memory (ROM) storing programs executed by the CPU, and a random access memory (RAM) used by the CPU for calculation.

The image pickup apparatus also includes a reproducing unit 124 and an input unit 125. The reproducing unit 124 converts the image information recorded in the recording unit 122 into a signal form that can be displayed in the display unit 110. The input unit 125 includes the shooting mode dial 115, the release switch 116, the viewfinder mode selection switch 117, the AF mode selection button 118, the metering mode selection button 119, and so on.

Figure 6:
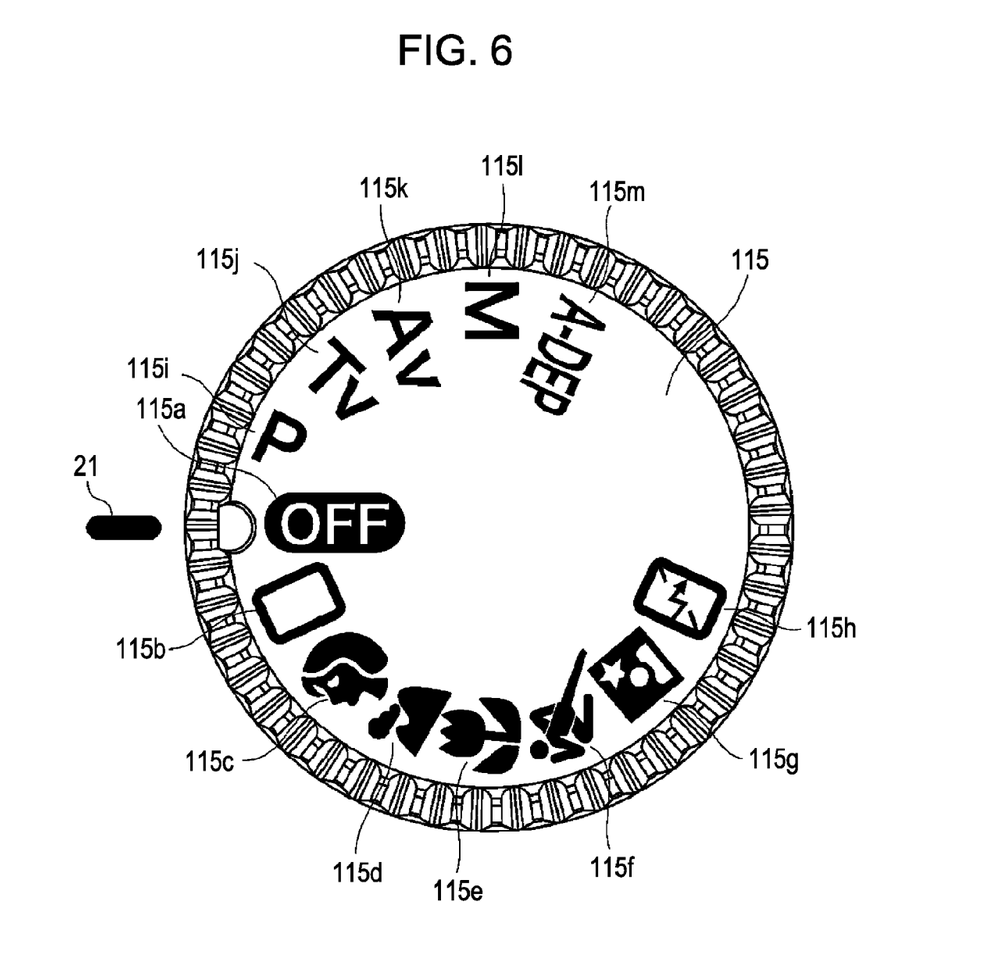
FIG. 6 is a detailed external view of the shooting mode dial.

FIG. 6 is a detailed external view of the shooting mode dial 115. The shooting mode dial 115 has dial icons 115a to 115m that correspond to shooting modes and that are arranged along the perimeter of the shooting mode dial 115. The dial icon opposing a dial index 21 provided on the camera body 101 is currently selected. In other words, the rotational position of the shooting mode dial 115 directly indicates the shooting mode that is currently set.

The dial icon 115a indicates "OFF". The dial icon 115a is selected to turn off the camera body 101.

The dial icon 115b indicates a "fully automatic mode". The dial icon 115b is selected to select a combination corresponding to the metering result from among multiple combinations of shutter speeds (hereinafter referred to as "Tv values") and f-numbers (hereinafter referred to as "Av values") that are set in advance. In the fully automatic mode, the one-shot AF is automatically converted into the servo AF regardless of the operation state of the AF mode selection button 118. In the one-shot AF, the focal length is fixed once in focus. In the servo AF, the focusing is continuously performed in accordance with the movement of a subject.

The dial icon 115c indicates a "portrait mode". The dial icon 115c is selected to capture an image under the shooting condition appropriate for shooting of a person (persons). The AF mode is set to the one-shot AF in the portrait mode regardless of the operation state of the AF mode selection button 118.

The dial icon 115d indicates a "landscape mode". The dial icon 115d is selected to capture an image under the shooting condition appropriate for shooting of a landscape. The AF mode is set to the one-shot AF in the landscape mode regardless of the operation state of the AF mode selection button 118.

The dial icon 115e indicates a "close-up mode". The dial icon 115e is selected to capture a close-up image of, for example, a flower or an insect. The AF mode is set to the one-shot AF in the close-up mode regardless of the operation state of the AF mode selection button 118.

The dial icon 115f indicates a "sports mode". The dial icon 115f is selected to capture an image under the shooting condition appropriate for shooting of a moving subject. The AF mode is set to the servo AF in the sports mode regardless of the operation state of the AF mode selection button 118.

The dial icon 115g indicates a "nightscape mode". The dial icon 115g is selected to capture an image such that appropriate exposures are achieved even at night for both a subject near the camera body 101 and a landscape out of strobe light. The AF mode is set to the one-shot AF in the nightscape mode regardless of the operation state of the AF mode selection button 118.

The dial icon 115h indicates a "strobe-light-inhibited fully automatic mode". The dial icon 115h is selected to capture an image in a state in which emission of the strobe light is inhibited. The strobe-light-inhibited fully automatic mode is the same as the fully automatic mode except for the inhibition of emission of the strobe light.

The shooting mode selection area including the dial icons 115a to 115h is called an "image zone". Selection of an image type of a subject allows appropriate image capturing in the image zone. In each of the shooting modes indicated by the dial icons 115b to 115h in the image zone, the metering mode is set to the evaluation metering regardless of the operation state of the metering mode selection button 119.

The dial icon 115i indicates a "program mode". The dial icon 115i is selected to select a combination corresponding to the metering result from among multiple combinations of predetermined Tv values and Av values.

The dial icon 115j indicates a "shutter speed priority AE photographing mode". The dial icon 115j is selected to determine the Av value corresponding to the metering result on the basis of the Tv value selected by a operator.

The dial icon 115k indicates a "aperture priority AE photographing mode". The dial icon 115k is selected to determine the Tv value corresponding to the metering result on the basis of the Av value selected by the operator.

The dial icon 115l indicates a "manual mode". The dial icon 115l is selected to capture an image on the basis of the Tv and Av values selected by the operator.

The dial icon 115m indicates an "automatic depth priority AE photographing mode". The dial icon 115m is selected to determine the Av value so as to focus the light onto all the AF areas where images of a subject are captured. The Tv value corresponding to the metering result is determined on the basis of the determined Av value. In the automatic depth priority AE photographing mode, an AF operation is performed in which the focus positions are concurrently detected in the multiple AF areas regardless of the operation state of the AF mode selection button 118.

The shooting mode selection area including the dial icons 115i to 115m is called a "creative zone". In each of the shooting modes indicated by the dial icons 115i to 115m in the creative zone, the operator can operate the AF mode selection button 118 to arbitrarily set the one-shot AF or the servo AF and can operate the metering mode selection button 119 to arbitrarily set the evaluation metering or the partial metering.

The operator can operate the viewfinder mode selection switch 117 to select either of the subject observation mode (optical viewfinder mode) with the viewfinder optical system 114 and the subject observation mode (electronic viewfinder mode) with the display unit 110. When the subject observation mode (electronic viewfinder mode) with the display unit 110 is selected, a process illustrated in FIG. 3 described below is performed. When the subject observation mode (optical viewfinder mode) with the viewfinder optical system 114 is selected, a process illustrated in FIG. 4 described below is performed.

The digital camera according to the embodiment of the present invention is set so that the electronic viewfinder mode cannot be selected when the shooting mode is set to the sports mode. In other words, the AF mode is automatically set to the servo AF in the sports mode. In general, in a typical digital single lens reflex camera, both the main mirror 105 and the sub-mirror 106 are retracted from the optical path in the electronic viewfinder mode. Accordingly, it is not possible to perform the AF operation in the focus detector 107 and the AF operation is performed in the image pickup device 109 (hereinafter referred to as imaging plane AF). However, since the imaging plane AF is inappropriate for a moving subject, the sports mode in the electronic viewfinder mode is inappropriate for capturing an image of a moving subject. Consequently, according to the embodiment of the present invention, the combination of the sports mode and the electronic viewfinder mode is inhibited to prevent switching to the electronic viewfinder mode when the shooting mode is set to the sports mode. In addition, the combination of the servo AF and the electronic viewfinder mode is inhibited to fix the AF mode to the one-shot AF in the electronic viewfinder mode, thereby preventing switching to the servo AF.

Furthermore, since the AF operation in which the focus positions are concurrently detected in the multiple AF areas cannot be performed in the imaging plane AF, the digital camera according to the embodiment of the present invention inhibits the combination of the automatic depth priority AE photographing mode and the electronic viewfinder mode to prevent switching to the electronic viewfinder mode when the shooting mode is set to the automatic depth priority AE photographing mode.

Referring back to FIG. 2, the image pickup apparatus further includes an exposure controller 126. The exposure controller 126 controls the operations of the aperture mechanism 104 and the shutter mechanism 108 in accordance with the exposure measured by the metering device 131 or the image pickup device 109. In general, a typical digital single lens reflex camera can perform the metering with the metering device 131 in the optical viewfinder mode. However, since both the main mirror 105 and the sub-mirror 106 are retracted from the optical path in the electronic viewfinder mode, the metering is performed in the image pickup device 109 (referred to as imaging plane AE).

It is relatively easy to match the metering result by the metering device 131 with the metering result by the image pickup device 109 when the metering mode is set to the evaluation metering whereas it is difficult to match the metering result by the metering device 131 with the metering result by the image pickup device 109 when the metering mode is set to the partial metering. Accordingly, in the digital camera according to the embodiment of the present invention, the combination of the partial metering and the electronic viewfinder mode is inhibited to fix the metering mode to the evaluation metering in the electronic viewfinder mode, thereby preventing switching to the partial metering.

Exemplary operations of the image pickup apparatus will now be described.

First, switching from the optical viewfinder mode to the electronic viewfinder mode will now be described with reference to FIG. 3.

Figure 3:
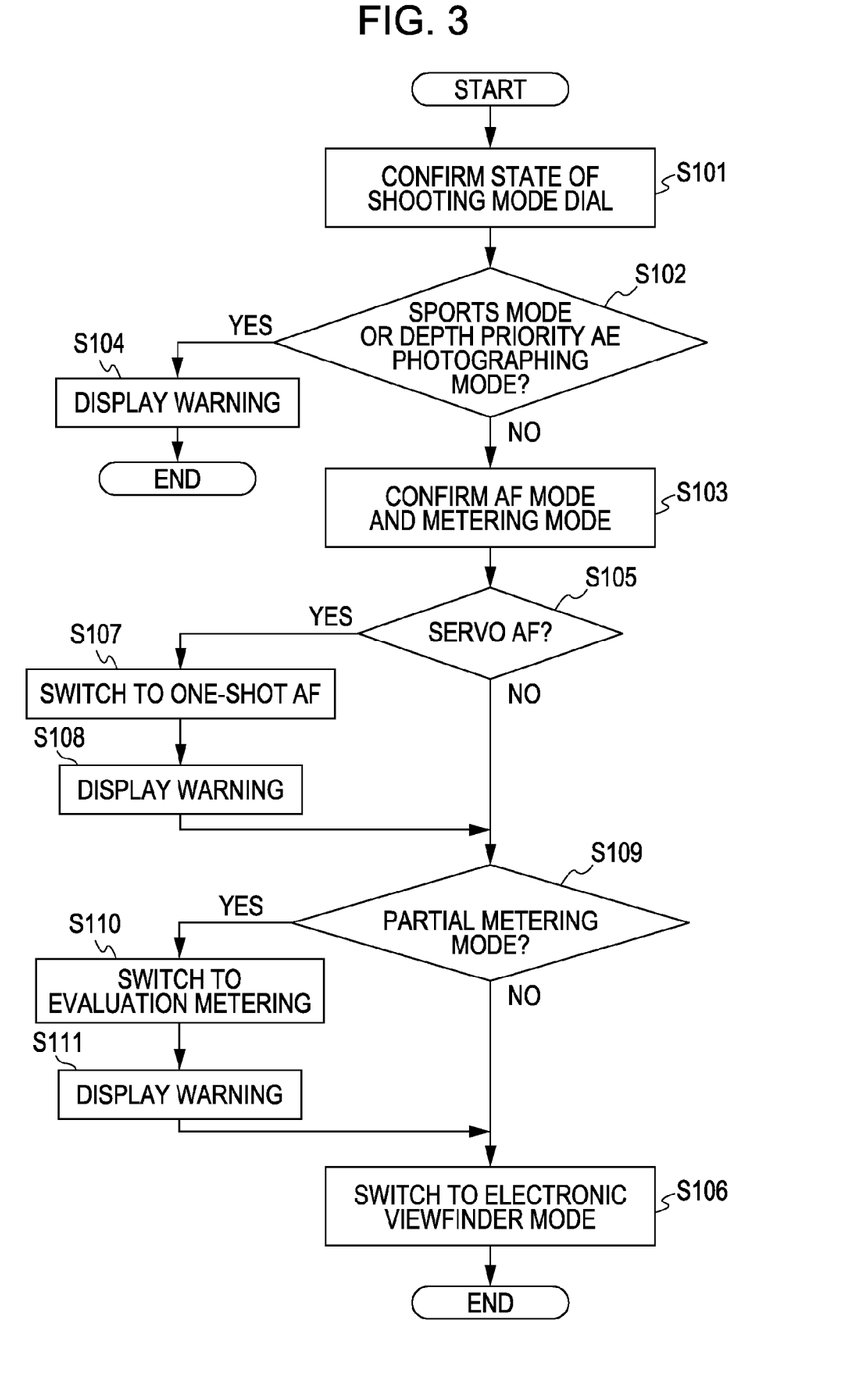
FIG. 3 is a flowchart illustrating an example of a process performed by a control unit when an optical viewfinder mode is switched to an electronic viewfinder mode.

FIG. 3 is a flowchart illustrating an example of a process performed by the control unit 123 when the optical viewfinder mode is switched to the electronic viewfinder mode.

It is presumed that the digital camera is set so as to permit capturing of a still image with reference to a live-view image (electronic viewfinder image) with the viewfinder mode selection switch 117. If the optical viewfinder mode is switched to the electronic viewfinder mode with the viewfinder mode selection switch 117 in the above set state, the process illustrated in FIG. 3 is started.

In Step S101, the control unit 123 confirms the position of the shooting mode dial 115. In Step S102, the control unit 123 determines whether the shooting mode is set to the sports mode or the automatic depth priority AE photographing mode with the shooting mode dial 115. If the control unit 123 determines that the shooting mode is set to the sports mode or the automatic depth priority AE photographing mode, the process goes to Step S104. If the control unit 123 determines that a shooting mode other than the sports mode and the automatic depth priority AE photographing mode is set, the process goes to Step S103.

In Step S104, the control unit 123 displays a warning to the operator that it is not possible to switch to the electronic viewfinder mode in the display unit 110 and the process terminates.

In Step S103, the control unit 123 confirms the AF mode and the metering mode that are currently set. In Step S105, the control unit 123 determines whether the AF mode is currently set to the servo AF. If the control unit 123 determines that the AF mode is currently set to the servo AF, the process goes to Step S107. If the control unit 123 determines that the AF mode is currently set to the one-shot AF, the process goes to Step S109.

In Step S107, the control unit 123 forcedly switches the current servo AF to the one-shot AF. In Step S108, the control unit 123 displays a warning to the operator that the AF mode is changed in the display unit 110 and the process goes to Step S109.

In Step S109, the control unit 123 determines whether the metering mode is currently set to the partial metering. If the control unit 123 determines that the metering mode is currently set to the partial metering, the process goes to Step S110. If the control unit 123 determines that the metering mode is currently set to the evaluation metering, the process goes to Step S106.

In Step S110, the control unit 123 forcedly switches the current partial metering to the evaluation metering. In Step S111, the control unit 123 displays a warning to the operator that the metering mode is changed in the display unit 110 and the process goes to Step S106.

In Step S106, the control unit 123 switches the viewfinder mode from the optical viewfinder mode to the electronic viewfinder mode.

As described above, if an operation member, such as a dial, indicating the set state by the position thereof is set so as to be inappropriate for the electronic viewfinder mode, switching to the electronic viewfinder mode is inhibited. This is because, when the operation member indicating the set state by the position thereof is set so as to be inappropriate for the electronic viewfinder mode (that is, when the combination of the electronic viewfinder mode and the setting of the operation member is inhibited), forcedly clearing (changing) the setting causes mismatching between the position of the operation member and the state set by the operation member.

In contrast, if an operation member, such as a pushbutton switch, whose position is irrelevant to the set state is set so as to be inappropriate for the electronic viewfinder mode (that is, if the combination of the electronic viewfinder mode and the setting of the operation member is inhibited), the setting is forcedly cleared (changed) and the viewfinder mode is switched to the electronic viewfinder mode. When the operation member whose position is irrelevant to the set state is set so as to be inappropriate for the electronic viewfinder mode, forcedly clearing (changing) the setting does not cause mismatching between the position of the operation member and the state set by the operation member.

Next, switching from the electronic viewfinder mode to the optical viewfinder mode will now be described with reference to FIG. 4.

Figure 4:
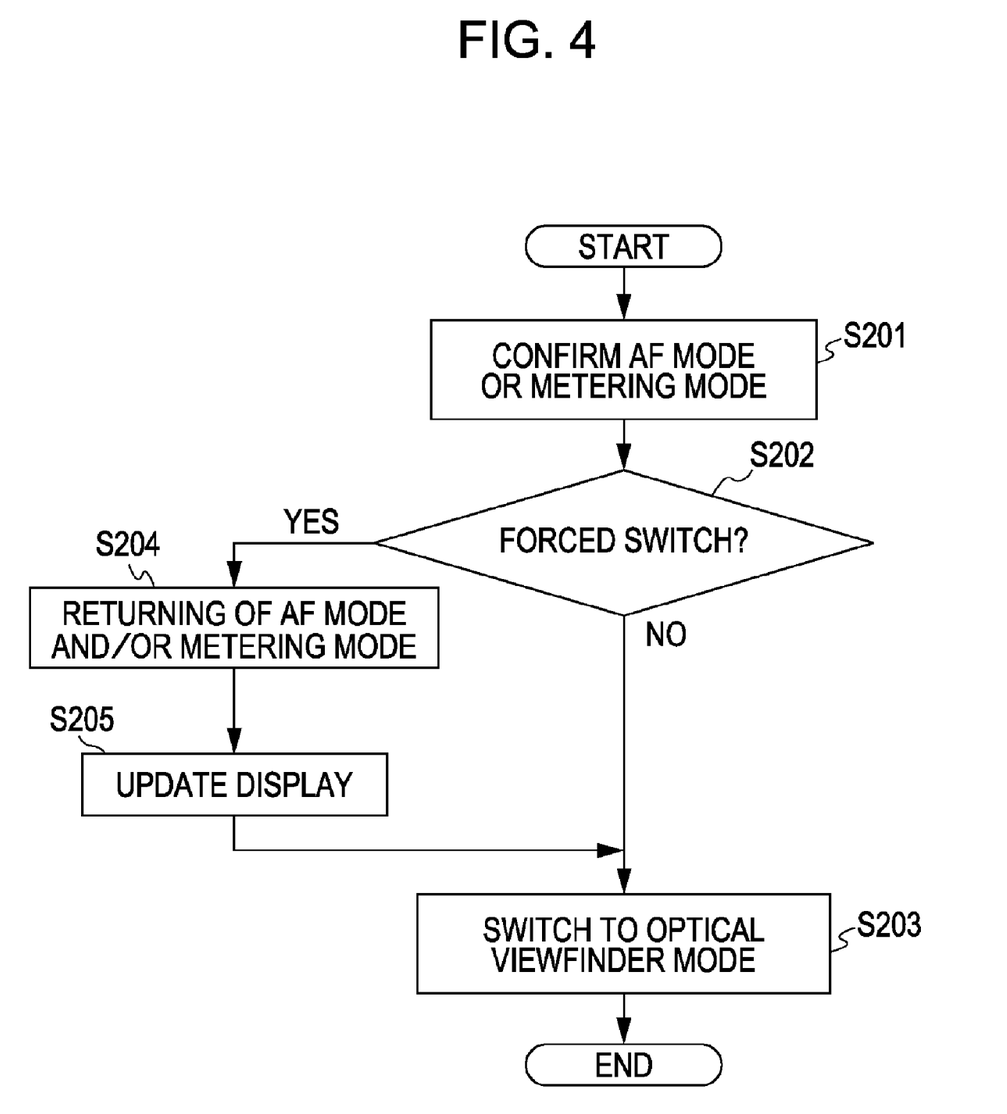
FIG. 4 is a flowchart illustrating an example of a process performed by the control unit when the electronic viewfinder mode is switched to the optical viewfinder mode.

FIG. 4 is a flowchart illustrating an example of a process performed by the control unit 123 when the electronic viewfinder mode is switched to the optical viewfinder mode.

After the viewfinder mode selection switch 117 is operated to switch the viewfinder mode from the electronic viewfinder mode to the optical viewfinder mode, the process illustrated in FIG. 4 is started. If the electronic viewfinder mode is continued for a long time, the control unit 123 might forcedly switch the viewfinder mode from the electronic viewfinder mode to the optical viewfinder mode because the image pickup device 109 can get hot. The process illustrated in FIG. 4 is performed also in this case.

At start of capturing of a still image with reference to a live-view image (electronic viewfinder image), in Step S201, the control unit 123 confirms the AF mode and the metering mode. Specifically, in Step S202, the control unit 123 determines whether the AF mode is forcedly switched in Step S107 in FIG. 3 and whether the metering mode is forcedly switched in Step S110 in FIG. 3. If the control unit 123 determines that AF mode and/or the metering mode is forcedly switched (the affirmative in Step S202), the process goes to Step S204. If the control unit 123 determines that the AF mode and the metering mode are not forcedly switched (negative in Step S202), the process goes to Step S203.

In Step S204, the control unit 123 returns the AF mode forcedly switched in Step S107 in FIG. 3 and/or the metering mode forcedly switched in Step S110 in FIG. 3 to the original AF mode and/or metering mode before the switching. In Step S205, the control unit 123 clears the display of the warning in Step S108 and/or in Step S111 in FIG. 3 and updates the display of the AF mode and/or the metering mode. Then, the process goes to Step S203.

In Step S203, the control unit 123 switches the viewfinder mode from the electronic viewfinder mode to the optical viewfinder mode.

An exemplary operation of the image pickup apparatus performed when the shooting mode dial 115, the AF mode selection button 118, or the metering mode selection button 119 is operated in the electronic viewfinder mode will now be described with reference to FIG. 5.

Figure 5:
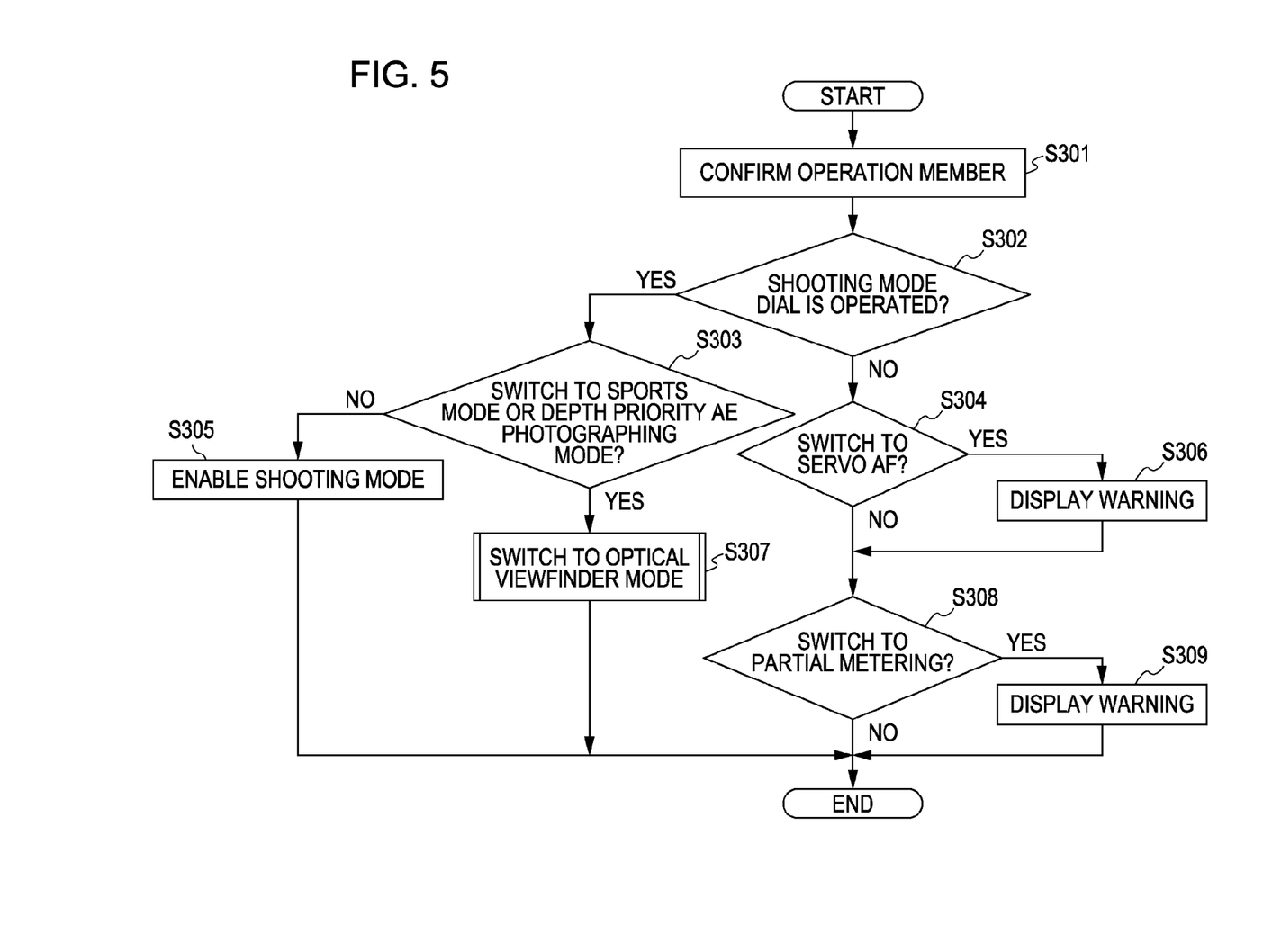
FIG. 5 is a flowchart illustrating an example of a process performed by the control unit when a shooting mode dial, an AF mode selection button, or a metering mode selection button is operated in the electronic viewfinder mode.

FIG. 5 is a flowchart illustrating an example of a process performed by the control unit 123 when the shooting mode dial 115, the AF mode selection button 118, or the metering mode selection button 119 is operated in the electronic viewfinder mode.

After the shooting mode dial 115, the AF mode selection button 118, or the metering mode selection button 119 is operated in the electronic viewfinder mode, the process illustrated in FIG. 5 is started.

In Step S301, the control unit 123 confirms the shooting mode dial 115, the AF mode selection button 118, and the metering mode selection button 119. Specifically, in Step S302, the control unit 123 determines whether the shooting mode dial 115 is operated. If the control unit 123 determines that the shooting mode dial 115 is operated (affirmative in Step S302), the process goes to Step S303. If the control unit 123 determines that the AF mode selection button 118 or the metering mode selection button 119 is operated (negative in Step S302), the process goes to Step S304.

In Step S303, the control unit 123 determines whether the shooting mode is switched to the sports mode or the automatic depth priority AE photographing mode with the shooting mode dial 115. If the control unit 123 determines that the shooting mode is switched to the sports mode or the automatic depth priority AE photographing mode with the shooting mode dial 115, the process goes to Step S307. If the control unit 123 determines that shooting mode is switched to a shooting mode other than the sports mode and the automatic depth priority AE photographing mode, the process goes to Step S305.

In Step S307, the control unit 123 moves to the process of switching the viewfinder mode from the electronic viewfinder mode to the optical viewfinder mode illustrated in FIG. 4 and the process terminates.

In Step S305, the control unit 123 enables the shooting mode set with the shooting mode dial 115 and the process terminates.

In Step S304, the control unit 123 determines whether the AF mode is switched from the one-shot AF to the servo AF with the AF mode selection button 118. If the control unit 123 determines that the AF mode is switched from the one-shot AF to the servo AF, the process goes to Step S306. If the control unit 123 determines that the one-shot AF is kept, the process goes to Step S308.

In Step S306, the control unit 123 does not accept the switching to the servo AF and displays a warning that switching to the servo AF cannot be accepted in the electronic viewfinder mode in the display unit 110 and the process goes to Step S308.

In Step S308, the control unit 123 determines whether the metering mode is switched from the evaluation metering to the partial metering with the metering mode selection button 119. If the control unit 123 determines that the metering mode is switched from the evaluation metering to the partial metering, the process goes to Step S309. If the evaluation metering is kept, the process terminates.

In Step S309, the control unit 123 does not accept the switching to the partial metering and displays a warning that switching to the partial metering cannot be accepted in the electronic viewfinder mode in the display unit 110 and the process terminates.

As described above, according to the embodiment of the present invention, the setting in the capturing of a still image with reference to a live-view image (electronic viewfinder image) is automatically matched with the setting in the capturing of a still image with reference to a non-live-view image (optical viewfinder image) when switching between the capturing of a still image with reference to the live-view image (electronic viewfinder image) and the capturing of a still image with reference to the non-live-view image (optical viewfinder image) is performed. In addition, a warning involved in the matching is displayed. Consequently, it is possible to achieve superior user-friendliness.

Other Exemplary Embodiments

The present invention can be embodied by performing the following processes. Specifically, a storage medium having the program code of software realizing the functions according to the above embodiments is supplied to a system or an apparatus. The computer (or the CPU or the micro processing unit (MPU)) of the system or apparatus reads out and executes the program code stored in the storage medium.

In this case, the program code itself read out from the storage medium realizes the functions of the embodiments described above. The present invention is applicable to the program code and the storage medium having the program code stored therein.

The storage medium supplying the program may be any storage medium, such as a floppy disc, a hard disk, a magneto-optical disc, a compact disc-read only memory (CD-ROM), a compact disc recordable (CD-R), a compact disc rewritable (CD-RW), a digital versatile disc-read only memory (DVD-ROM), a DVD-RAM, a DVD-RW, a DVD+RW, a magnetic tape, a nonvolatile memory card, or another ROM. Alternatively, the program code may be downloaded over a network.

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-028275 filed Feb. 7, 2007, which is hereby incorporated by reference herein in its entirety.

What is claimed is:

1. An image pickup apparatus comprising:
an optical viewfinder;
an electronic viewfinder;
a viewfinder mode switching unit configured to switch between an electronic viewfinder mode in which a subject is observed with the electronic viewfinder and an optical viewfinder mode in which the subject is observed with the optical viewfinder;
a first mode setting unit that is able to set a first mode or a second mode to the image pickup apparatus by operating a first operation member, wherein a combination with the electronic viewfinder mode is inhibited in the first mode and a combination with the electronic viewfinder mode is allowed in the second mode, and wherein the first mode setting unit indicates whether the first mode is set or the second mode is set according to a state of the first operation member;

a second mode setting unit that is able to set a third mode or a fourth mode to the image pickup apparatus by operating a second operation member, wherein a combination with the electronic viewfinder mode is inhibited in the third mode and a combination with the electronic viewfinder mode is allowed in the fourth mode, and wherein the second mode setting unit does not indicate whether the third mode or the fourth mode is set according to a state of the second operation member; and a control unit configured to control an operation of the image pickup apparatus according to the viewfinder mode switching unit, the first mode setting unit and second mode setting unit, wherein in a case where switching the viewfinder mode from the optical viewfinder mode to the electronic viewfinder mode when the first mode is set, the control unit maintains the setting of the first mode and rejects to switch the viewfinder mode from the optical viewfinder mode to the electronic viewfinder mode, and wherein in a case where switching the viewfinder mode from the optical viewfinder mode to the electronic viewfinder mode when the third mode is set, the control unit changes the setting of the third mode to the setting of the fourth mode and switches the viewfinder mode from the optical viewfinder mode to the electronic viewfinder mode.

2. The image pickup apparatus according to claim 1,
wherein the first operation member is a mode dial, and
wherein the second operation member is a pushbutton switch.

3. The image pickup apparatus according to claim 1,
wherein the first operation member is a shooting mode dial used to set a shooting mode, and
wherein the second operation member is a pushbutton switch used to set an automatic focus mode.

4. The image pickup apparatus according to claim 3,
wherein the first mode is a shooting mode appropriate for capturing an image of a moving body, and
wherein the third mode is an automatic focus mode in which the automatic focus is continuously repeated.

5. The image pickup apparatus according to claim 1,
wherein the first operation member is a shooting mode dial used to set a shooting mode, and
wherein the second operation member is a pushbutton switch used to set a metering mode.

6. The image pickup apparatus according to claim 5,
wherein the first mode is a shooting mode appropriate for capturing an image of a moving body, and
wherein the third mode is a partial metering mode in which part of the shooting range is subjected to metering.

7. The image pickup apparatus according to claim 1, further comprising:
a warning unit configured to issue a warning that the first mode or the third mode is switched to the setting in which the combination with the electronic viewfinder mode is not inhibited.

8. The image pickup apparatus according to claim 1,
wherein, if the third mode is switched to the fourth mode to switch to the electronic viewfinder mode and the electronic viewfinder mode is switched to the optical viewfinder mode again, the control unit returns the switched setting to the original setting.

9. An image pickup apparatus comprising:
an optical viewfinder;
an electronic viewfinder;
a viewfinder mode switching unit configured to switch between an electronic viewfinder mode in which a subject is observed with the electronic viewfinder and an optical viewfinder mode in which the subject is observed with the optical viewfinder;
a first mode setting unit that is able to set a first mode or a second mode to the image pickup apparatus by operating a first operation member, wherein a combination with the electronic viewfinder mode is inhibited in the first setting mode and a combination with the electronic viewfinder mode is allowed in the second setting mode, and wherein the first mode setting unit indicates whether the first mode is set or the second mode is set according to a state of the first operation member;
a second mode setting unit that is able to set a third mode or a fourth mode to the image pickup apparatus by operating a second operation member, wherein a combination with the electronic viewfinder mode is inhibited in the third mode and a combination with the electronic viewfinder mode is allowed in the fourth mode, and wherein the second mode setting unit does not indicate whether the third mode or the fourth mode is set according to a state of the second operation member; and
a control unit configured to control an operation of the image pickup apparatus according to the viewfinder mode switching unit, the first mode setting unit and second mode setting unit, wherein in a case where setting the first mode when the viewfinder mode is the electronic viewfinder mode, the control unit switches the viewfinder mode from the electronic viewfinder mode to the optical viewfinder mode and sets the first mode by, and wherein in a case where setting the third mode when the viewfinder mode is to the electronic viewfinder mode, the control unit maintains the viewfinder mode in the electronic viewfinder mode and rejects the setting of the third mode.

10. The image pickup apparatus according to claim 9,
wherein the first operation member is a mode dial, and
wherein the second operation member is a pushbutton switch.

11. The image pickup apparatus according to claim 9,
wherein the first operation member is a shooting mode dial used to set a shooting mode, and
wherein the second operation member is a pushbutton switch used to set an automatic focus mode.

12. The image pickup apparatus according to claim 11,
wherein the first mode is a shooting mode appropriate for capturing an image of a moving body, and
wherein the third mode is an automatic focus mode in which the automatic focus is continuously repeated.

13. The image pickup apparatus according to claim 9,
wherein the first operation member is a shooting mode dial used to set a shooting mode, and
wherein the second operation member is a pushbutton switch used to set a metering mode.

14. The image pickup apparatus according to claim 13,
wherein the first mode is a shooting mode appropriate for capturing an image of a moving body, and
wherein the third mode is a partial metering mode in which part of the shooting range is subjected to metering.

* * * * *